US007841130B2

(12) United States Patent  (10) Patent No.: US 7,841,130 B2
Blau  (45) Date of Patent: Nov. 30, 2010

(54) HUMANE ANIMAL TRAP

(75) Inventor: Irwin Blau, New Castle, NH (US)

(73) Assignee: Pied Piper International, Inc., New Castle, NH (US)

( * ) Notice: Subject to any disclaimer, the term of this patent is extended or adjusted under 35 U.S.C. 154(b) by 1073 days.

(21) Appl. No.: 11/187,098

(22) Filed: Jul. 22, 2005

(65) Prior Publication Data

US 2007/0017148 A1  Jan. 25, 2007

(51) Int. Cl.
A01M 23/08 (2006.01)
A01M 23/18 (2006.01)
(52) U.S. Cl. ............................................... 43/66; 43/65
(58) Field of Classification Search .................... 43/65, 43/66
See application file for complete search history.

(56) References Cited

U.S. PATENT DOCUMENTS

| | | | | |
|---|---|---|---|---|
| 2,231,191 A | * | 2/1941 | Martino | 43/66 |
| 2,573,759 A | * | 11/1951 | Blatchford | 43/76 |
| 2,787,082 A | * | 4/1957 | Paschen | 43/66 |
| 2,995,861 A | * | 8/1961 | Osborn | 43/66 |
| 3,786,591 A | * | 1/1974 | Morford | 43/66 |
| 3,984,936 A | | 10/1976 | Camp | |
| 3,991,508 A | * | 11/1976 | Petrosky | 43/66 |
| 4,550,523 A | | 11/1985 | Spiller | |
| 4,782,620 A | * | 11/1988 | Syszczyk et al. | 43/61 |
| 4,787,170 A | | 11/1988 | Kingsbury et al. | |
| 4,899,484 A | | 2/1990 | Morin | |
| 5,325,622 A | * | 7/1994 | Merickel | 43/66 |
| 5,327,673 A | | 7/1994 | Paglia | |
| 5,682,705 A | * | 11/1997 | Stahl | 43/66 |
| 5,979,105 A | * | 11/1999 | Marks | 43/61 |
| 6,029,392 A | * | 2/2000 | Relf | 43/61 |
| 6,564,501 B1 | | 5/2003 | Schislyonok | |

* cited by examiner

Primary Examiner—Darren W Ark

(57) ABSTRACT

There is described an improved one-way door for a humane animal trap of the type comprising a box-shaped enclosure having an opening at one end, and a hinged one-way door adapted to close said opening and also to swing freely upward into the enclosure to permit entry into the enclosure by an animal, then to fall back under the force of gravity to a closed position that traps the animal within the enclosure. The improved trap door has an upper portion comprising apertures sufficient to enable ample airflow into the trap and a weighted lower portion that speeds the drop of the door and that also lowers the center of gravity of the door, and that of the trap as a whole, and thereby functions to enhance the stability of the trap to reduce trap overturns and animal escapes. The apertures in the upper portion of the door provide the animal with an ample supply of air to reduce the stress it is subjected to prior to release. The metal and/or hard plastic composition of the door ensures that the animal will not gnaw a hole in the door to facilitate its escape.

9 Claims, 6 Drawing Sheets

HUMANE ANIMAL TRAP

BACKGROUND OF THE INVENTION

I. Field of the Invention

This invention relates generally to the design of an improved humane animal trap of the type adapted to trapping a rodent (or other small animal) within an enclosure having an opening that is closed by a one-way door hinged from the top of the opening in the enclosure.

II. Description of the Prior Art

The art of animal traps is old and includes many designs that may generally be divided into two broad categories including traps that physically maim or kill the animal, such as the well-known spring-loaded snap trap, and traps that capture the animal within an enclosure (including traps that provide a substantially airtight enclosure in which the animal dies by asphyxiation).

Enclosure traps overcome significant disadvantages of the spring-loaded snap traps, notably the danger of injury to users (and small children) who may trigger the trap accidentally, and also the unsanitary and offensive aspects associated with disposing of animals caught in snap traps.

The most successful of the enclosure traps, exemplified by the traps disclosed in U.S. Pat. No. 4,787,170, are characterized by a simplicity of design which makes for ease of use while enabling inexpensive manufacture. The trap disclosed in U.S. Pat. No. 4,787,170 is manufactured by injection molding of a light thermoplastic material, resulting in an integral rectangular box having an open end that is closed by an inward opening one-way door made of the same plastic material as the enclosure, hinged to the top of the enclosure. The light plastic, integral construction of this trap has the advantage of light weight, while providing a wholly closed trap which protects the home user from any need to handle, or risk of even touching, the trapped animal.

However, lengthy experience with enclosure traps of the type described in U.S. Pat. No. 4,787,170 for the trapping of rodents and particularly of mice has shown that certain disadvantages associated with such currently available enclosure traps render them unsuitable for a significant segment of the trap-purchasing public. First, many persons object to the "asphyxiation" traps as inhumane for subjecting trapped animals to a stressful death, citing evidence that mice caught in such traps often do not expire rapidly and instead thrash about furiously before succumbing. Also, instances have been reported of rodent escapes from these prior art traps resulting from (1) trap overturns, effected by the thrashing of a trapped rodent, that cause the trap door to open and permit the escape of the animal, and (2) the rodent's successful gnawing of a hole into a side edge of the trap's plastic door, either for use as a paw-hold to open the door inward into the trap, or escaping through the hole itself. It is therefore clear that many consumers desire a humane animal trap that catches and holds the animal, but that also permits the release of the trapped animal in good health, and, preferably, a trap that will not subject the trapped animal to excessive stress while trapped.

Accordingly there has been a need to provide an enclosure trap that avoids the disadvantages of the prior art enclosure traps.

SUMMARY OF THE INVENTION

It has been found that several different causes of animal escapes from enclosure traps of the prior art can be all be significantly ameliorated by simple modifications to the one-way door that closes the opening in the trap enclosure and that provides the animal's means of entry into the trap.

Specifically it has been found that use of a gnaw-proof door having a weighted lower portion provides several independent advantages to the effectiveness of the trap. First, use of a door material that is appreciably harder than the ordinary thermoplastic materials currently employed in injection-molded, enclosure-type mouse traps precludes a trapped rodent from successfully gnawing even the smallest aperture into an edge of the door, such as has been observed with a light plastic trap door, thus either gaining a paw-hold sufficient to enable it to pull the door back into an open position and enabling its escape, or escaping through the hole itself. Hard materials suitable for this purpose include both hard metals, such as steel or tungsten, and specialized, impact and abrasion resistant plastics such as polycarbonate polymers.

Second, providing a door made of a comparatively heavy material and/or having an enlarged lower portion as shown in FIG. 1, in conjunction with a trap enclosure made of a light plastic material, functions to increase significantly the inertia of the animal trap as a whole and particularly to lower its center of gravity, thereby making the trap substantially less susceptible to be overturned by the thrashing of a rodent caught within the trap.

Third, the weighting of the lower portion of the one-way door also functions to effect a more rapid and positive downward closing of the door to the floor of the enclosure, and adds inertial resistance to any effort by the trapped rodent to open said door from within the enclosure, thereby addressing and impeding yet another potential form of escape.

Fourth, as opposed to the enclosure traps of the type described in U.S. Pat. No. 4,787,170, in which the trapped animal may be made to expire by asphyxiation, the current embodiment comprises apertures in the upper portion of the door sufficient to ensure ample airflow into the trap, thereby reducing the level of stress of a trapped animal until its release.

In a preferred embodiment, therefore, an animal trap is provided comprising an enclosure having a substantially uniform integral configuration particularly suitable for low cost plastic molding or plastic injection manufacture, and a one-way, preferably metal or hard plastic door hinged to the top of an opening in the enclosure, said door having apertures in the upper portion and an enlarged lower portion combining to substantially weight the lower portion of the door.

DESCRIPTION OF PREFERRED EMBODIMENTS

Figure 1:
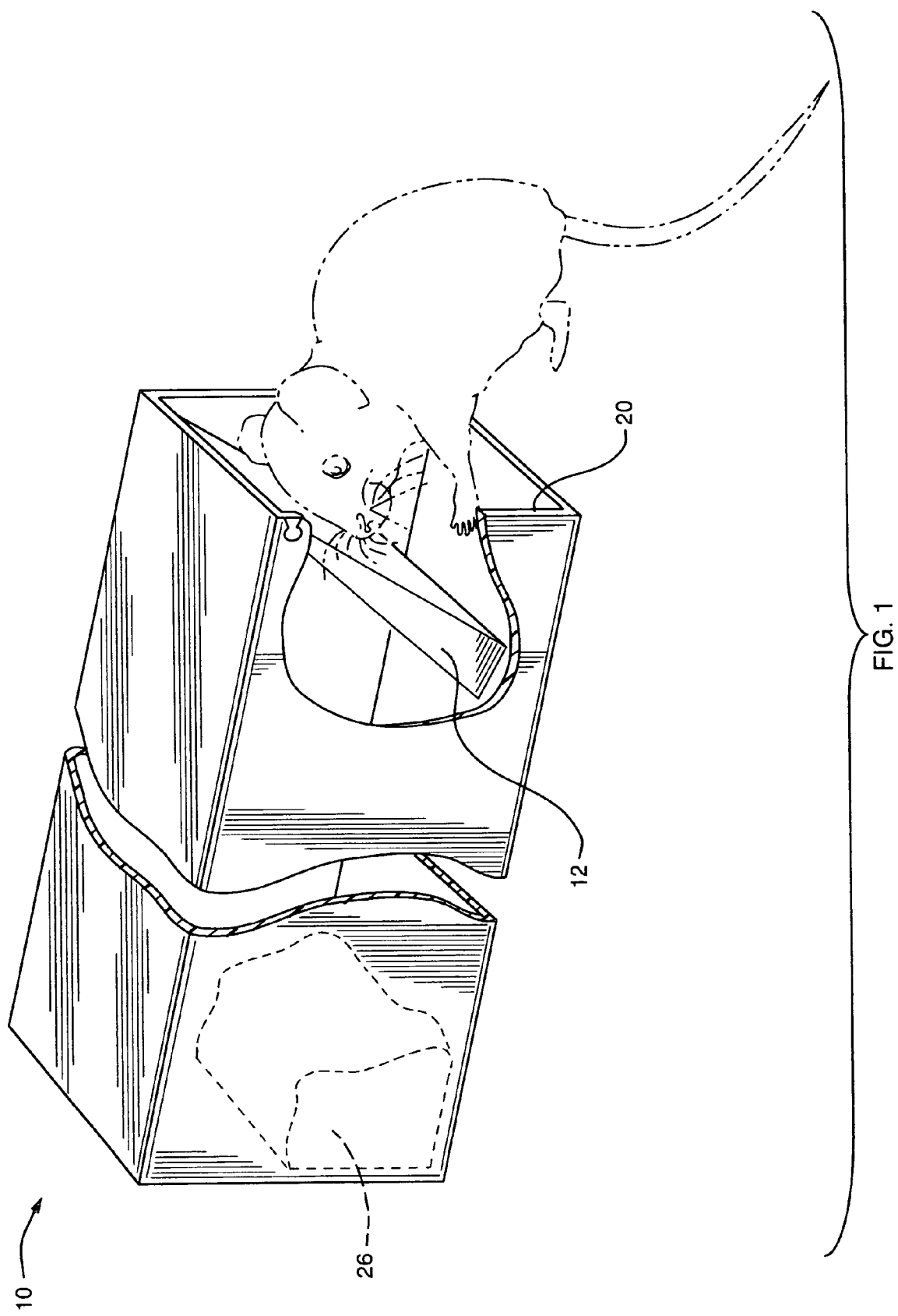
FIG. 1 is a three-dimensional view of a humane animal trap according to the invention illustrating the manner in which the door operates.
Figure 2:
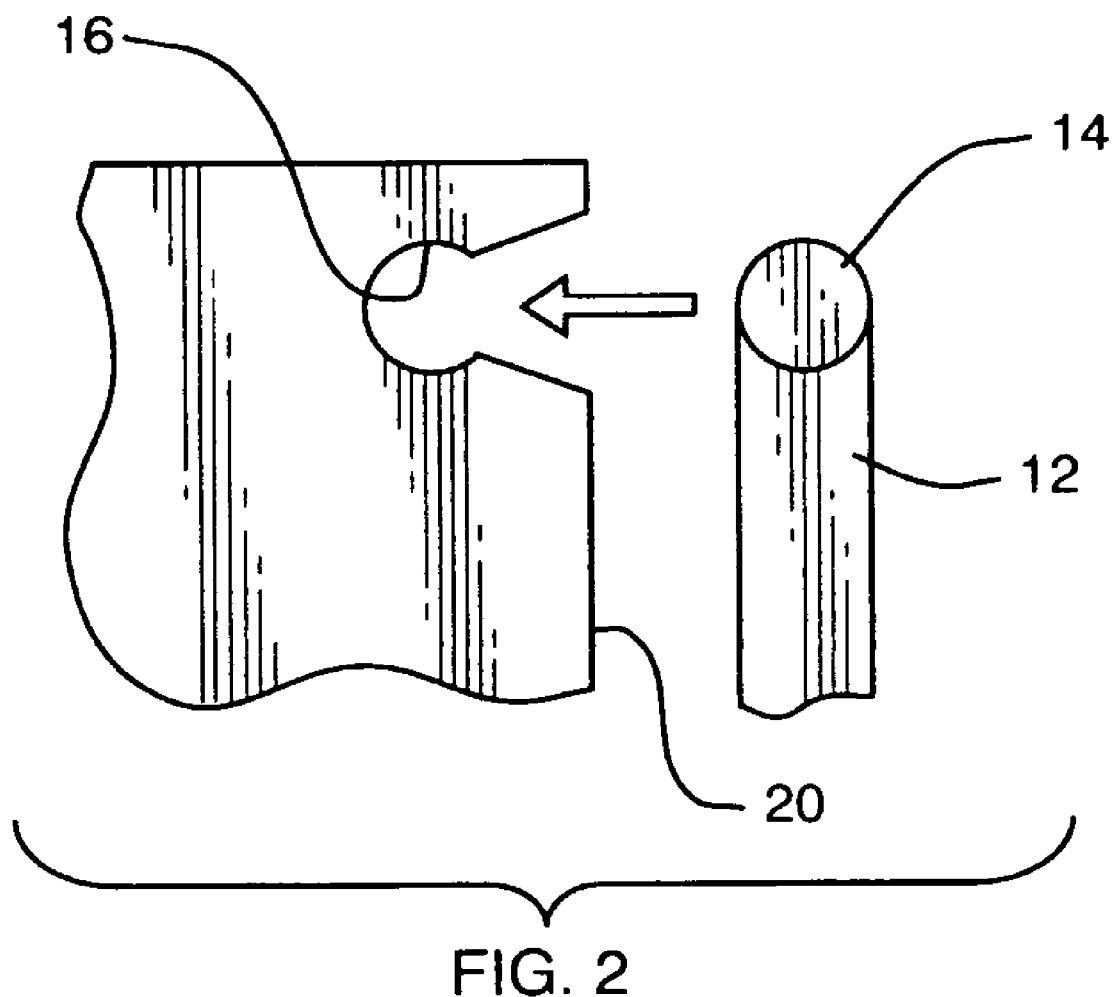
FIG. 2 is a cross-sectional side view of a detail of the invention illustrating the manner in which the door is hinged to the enclosure.
Figure 3:
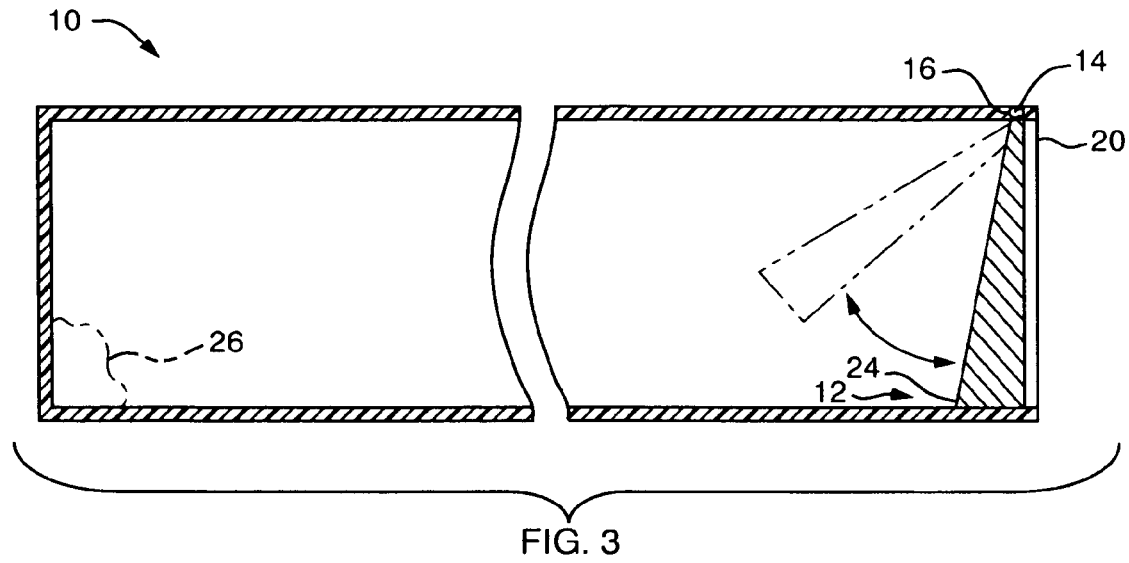
FIG. 3 is a cross-sectional side view of a trap according to the invention illustrating a one-way door having a weighted triangular cross-section.

Referring first to FIGS. 1-3 there is illustrated an animal trap of the enclosure type, consisting of only two discrete parts, including an elongated rectangular enclosure 10 made of a light plastic material and having one open end, and a one-way metal or hard plastic door 12 hinged from the top of the open end of the enclosure and adapted to close and seal the open end of the enclosure.

The top of door 12 comprises snap-in hinges each formed by an appendage 14 that extends sideward from the top of the door, and that snaps into and pivotally engages a receptacle 16 channeled to the front edge 20 of each side of the enclosure. Alternatively receptacles 16 may be "closed" holes (without an entry channel) into which appendages 14 snap when the door is squeezed between the somewhat flexible sides of the open end of enclosure 10. The length of door 12 is made slightly longer than the height of the opening in enclosure 10, and as a result door 12 is constrained to pivot upward and downward only within the interior of enclosure 10, and said door cannot open outward of said enclosure. Preferably door 12 is made of a hard metal impervious to gnawing by a trapped animal, and, most preferably, from a hard metal that is also comparatively easy to machine. Alternatively door 12 may be made from a hard plastic material, such as polycarbonate polymer, which has a hardness comparable to that of many metals. Suitable polycarbonate polymers would for example include Lexan SLX® polycarbonate resins marketed by the GE Plastics Company.

Figure 6:
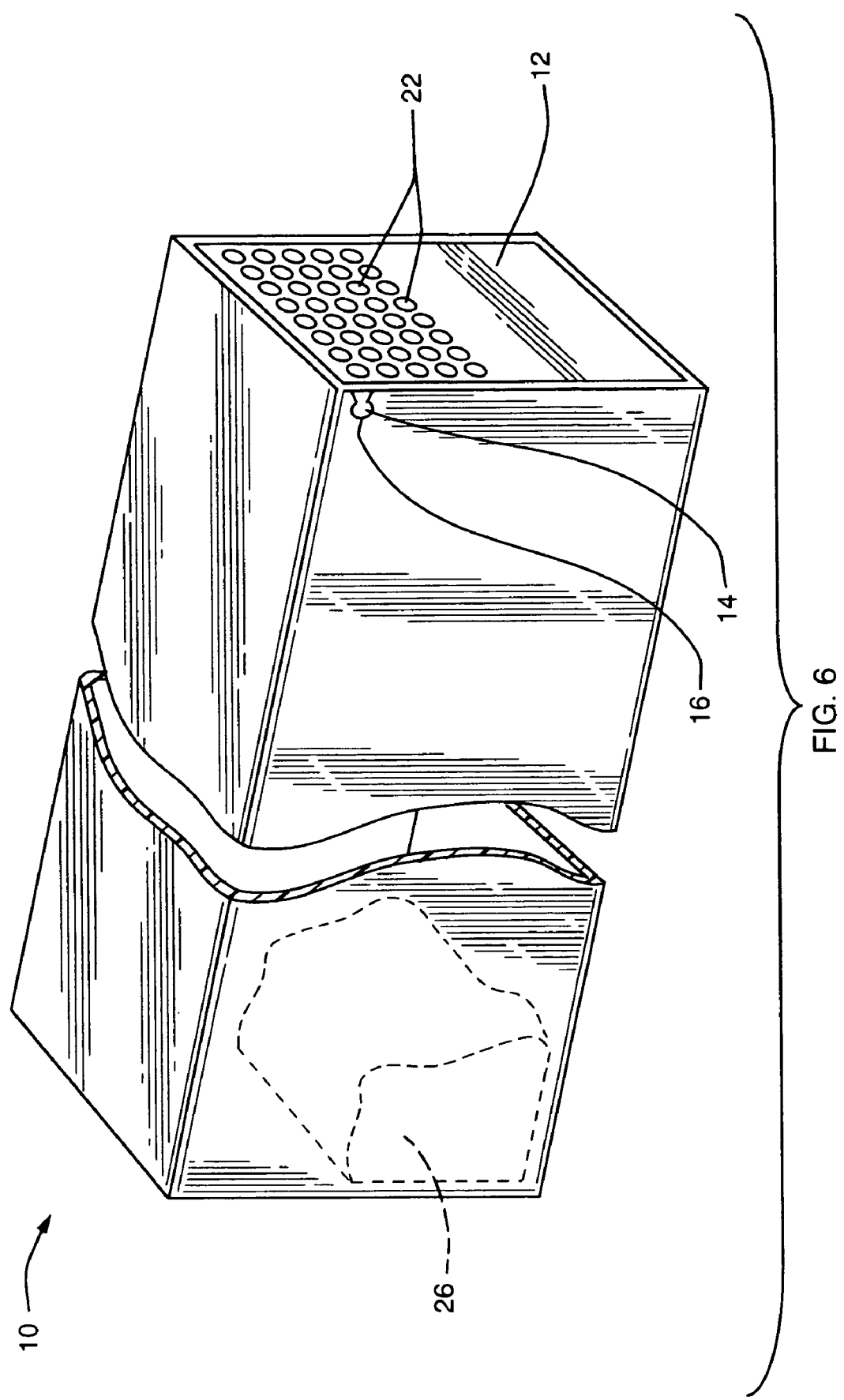
FIG. 6 is a perspective view of a one-way door showing an array of apertures in the upper portion of a weighted door for a trap according to the invention.
Figure 7:
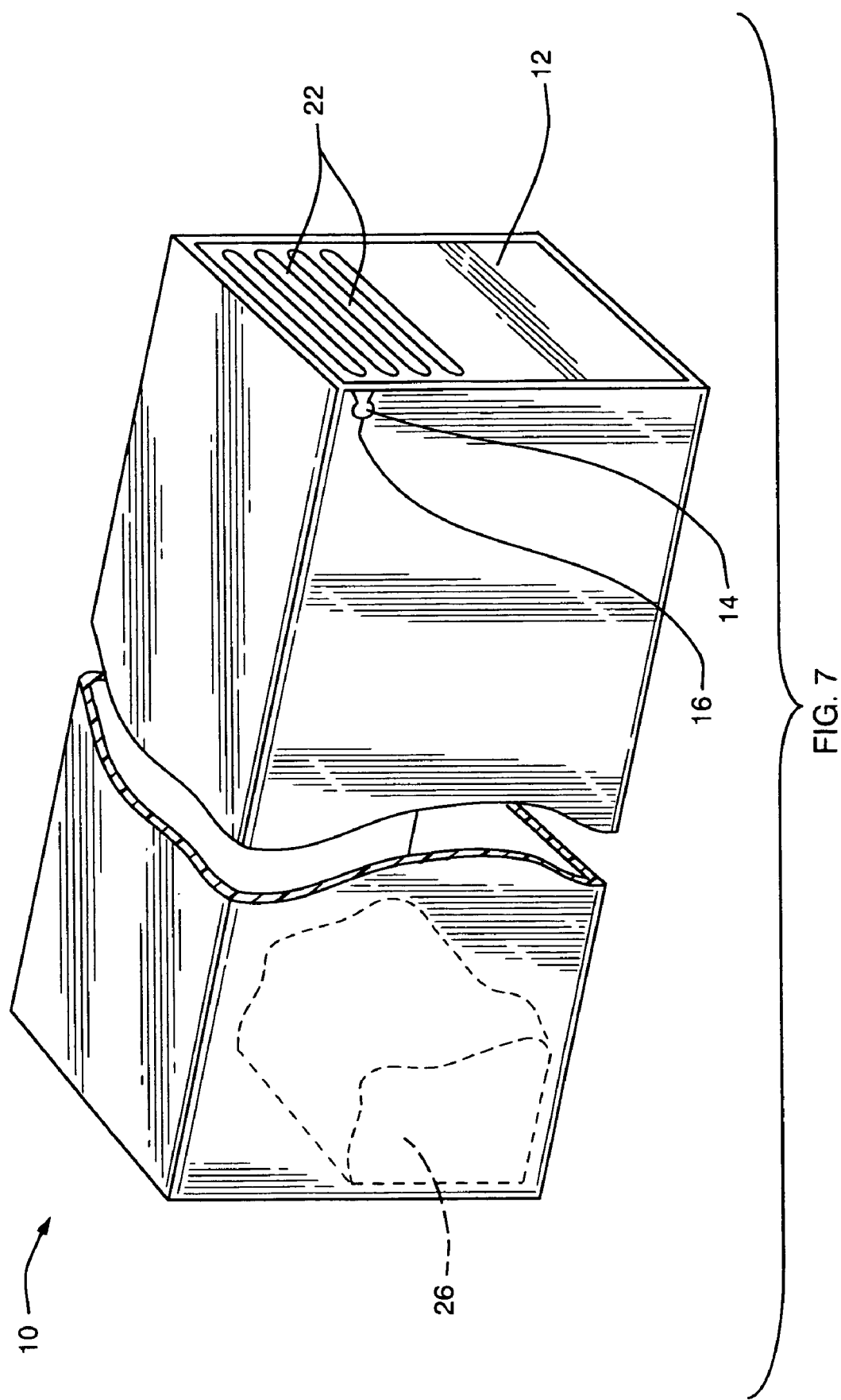
FIG. 7 is a perspective view of a one-way door showing vertical air slots in the upper portion of a weighted door for a trap according to the invention.
Figure 8:
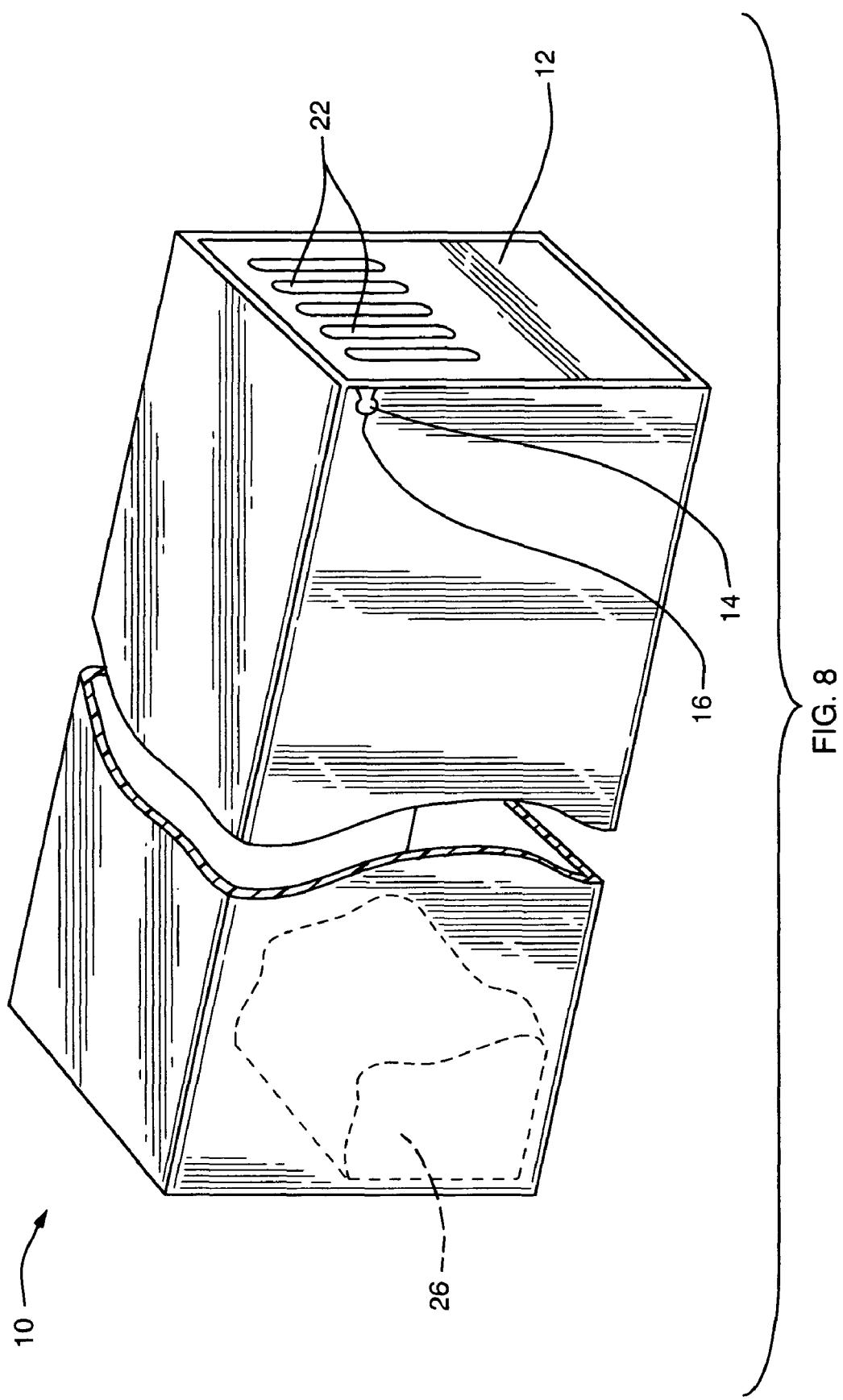
FIG. 8 is a perspective view of a one-way door showing horizontal air slots in the upper portion of a weighted door for a trap according to the invention.

As shown more clearly in FIG. 6, door 12 contains on its upper portion a plurality of apertures 22 to allow the escape of scent from bait 26 placed in the enclosure, provide ample air to the trapped animal, and also serve to lighten the upper portion of door 12 relative to its lower portion. In FIG. 6, said apertures consist of a plurality of cylindrical holes punched through the thickness of door 12, effectively converting the upper portion of door 12 into a surface akin to a grillwork. Alternatively said apertures in the upper portion of door 12 could have different shapes, such as the thin horizontal slots shown in the upper portion of door 12 in FIG. 7, or thin vertical slots as shown in the upper portion of door 12 in FIG. 8, but in any event apertures 22 should be designed to minimize possibilities for a trapped animal to use the apertures as "handles" with which to raise the one-way door. Placing the air-passing apertures 22 in the upper portion of door 12, rather than in the lower portion, serves both to reduce the possibility that an animal able to grasp an aperture could use that hold to pivot the door upward and open it, and also to reduce the weight of the upper portion of door 12 relative to the weight of the lower portion of said door.

In FIG. 3, the cross-section of door 12 is effectively triangular, having a thin apex at its top and wide cross-section at its base 24, whereby the lower portion of door 12 is "weighted" relative to the upper portion of the door. This embodiment is particularly effective to achieve the objectives of the invention if the door material has a relatively high specific gravity, for example at or higher than the specific gravity of iron, which is approximately 7.2. Thermoplastic materials suitable for injection molding manufacture typically have much lower specific gravities, in order of 1.0 to 1.5. However it is possible and would be appropriate to manufacture door 12 from a thermoplastic compound material comprising metallic or non-metallic fillers adapted to raise substantially its specific gravity. An example would be the Thermocomp HSG® resins manufactured by LNP Engineering Plastics (a GE Plastics Company) in Exton, Pa., which include resins having a specific gravity exceeding 7.0.

Figure 4:
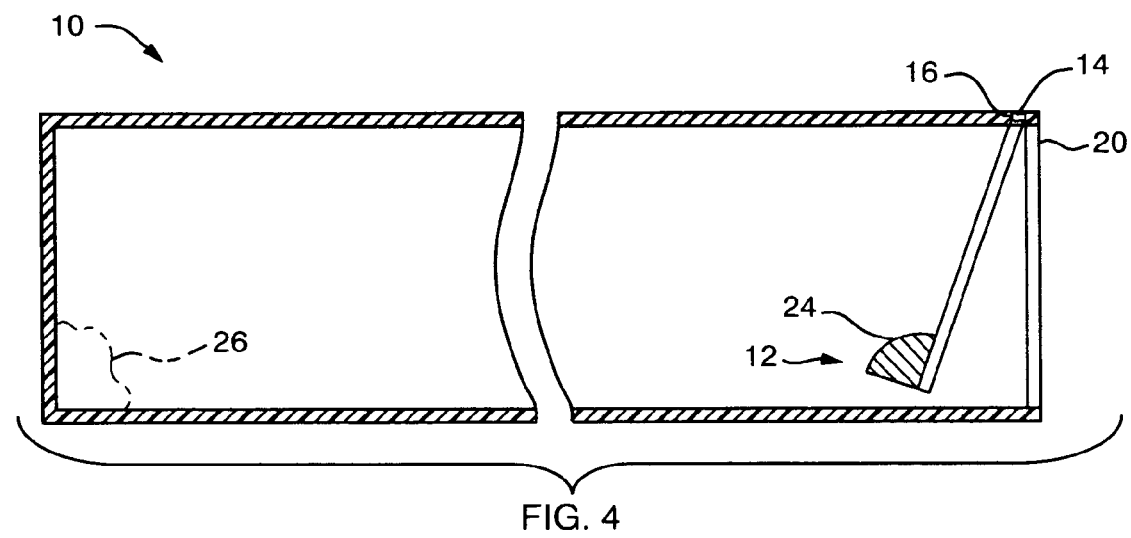
FIG. 4 is a cross-sectional side view of a one-way door employed in a second embodiment of a weighted door for a trap according to the invention.
Figure 5:
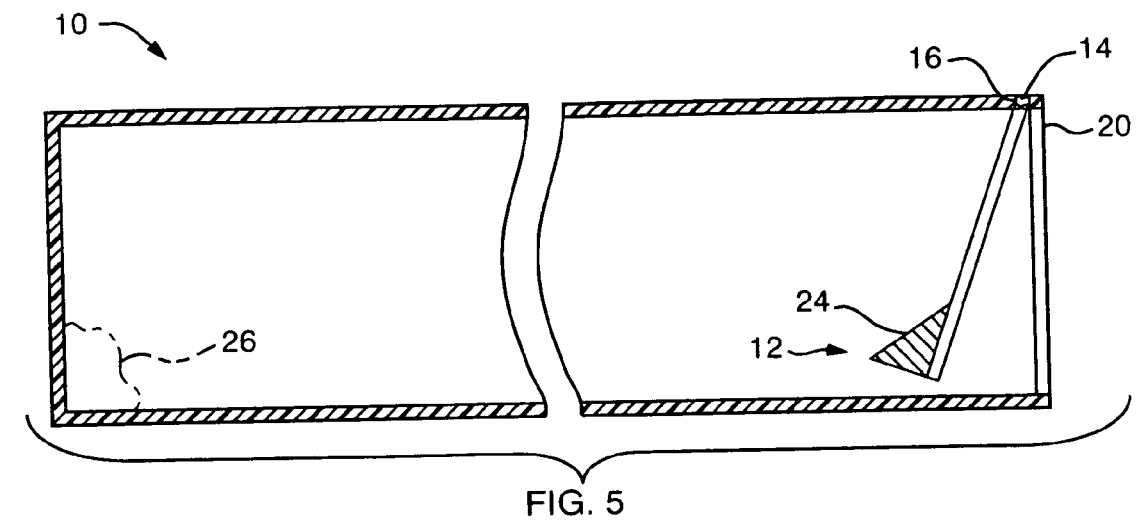
FIG. 5 is a cross-sectional side view of a one-way door employed in a third embodiment of a weighted door for a trap according to the invention.

FIGS. 4-5 illustrate other embodiments showing alternative ways that the lower portion of door 12 may be enlarged relative to the upper portion of the door, thereby weighting the lower portion of the door while minimizing the possibility of a trapped rodent engaging a paw-hold on or in the vicinity of the enlarged lower portion of door 12.

As shown in FIG. 3, base 24 is shaped to form a closure flush with the floor of enclosure 10 when door 12 is in its closed position, thus allowing a trapped animal little or no "purchase" with which to grasp the base of the door and attempt to pivot it upwards and open. As shown in FIGS. 4 and 5, enlargement 24 may alternatively comprise a separately manufactured element, shaped for example as a quarter cylinder, as shown in FIG. 4, secured by any suitable means to the front or the rear surface of door 12 at its base. Other shapes may be used for enlargement 24, including without limitation a contoured integral cross-section as shown in FIG. 5, a half sphere (not shown) having its flat face secured to the lower interior portion of the door, or still other suitable shapes.

Referring to FIG. 1, door 12 will readily open inward into the enclosure 10 when nudged by an animal attracted to enter the enclosure by bait scent diffusing through the orifices 22 in the door from bait placed within the enclosure near its closed end. When the body of the animal entering the enclosure has moved through the opening in the enclosure and past the door 12 which is pivoted upward by the animal, gravity will cause the door to rotate downward to a closed position with its bottom edge coming to rest against the floor of enclosure 10, at a point near but short of the vertical point below hinges 16, thereby trapping the animal within the enclosure.

To release an animal caught within the trap of the invention it is necessary only to turn enclosure 10 upside down, which will cause gravity to open door 12, and allow the trapped animal to exit the trap. The user of the trap is thus not required to handle the trapped animal in any way, and is protected against accidental contact with the trapped animal.

Traps of the present invention are preferably provided with a suitable form of bait material 22 which may be in the form of peanut butter, cheese or other substance that releases a scent attractive to rodents or other animals sought to be trapped. Commercial embodiments of the invention may thus be provided with a scented bait button secured to the rear wall of enclosure 10, opposite door 12, the freshness of which is preserved pending sale and use of the trap by a suitable hermetic, removable cover material that is removable by the user, for example by pulling a drawstring having one end secured to said cover and its other end exiting the trap through the door entrance. Alternatively, suitable porous materials infused with a scent-releasing substance attractive to the animals to be trapped may be secured to the interior of the trap to serve as bait, in order to relieve users from the task of baiting the trap.

What is claimed is:

1. A humane animal trap comprising:
   an elongated plastic enclosure having at one end a rectangular opening for permitting entry by an animal; and
   an integral one-way door hinged to a top of said opening, said door having an upper portion comprising a plurality of apertures providing an ample supply of air to a trapped animal and a weighted lower portion, and said door further having a height slightly greater than a height of said opening whereby said door is adapted when at rest to close said opening and to swing uniformly upward into said opening when pressed against by an animal entering the trap.

2. The animal trap of claim 1 wherein said door has a triangular cross-section including a base adapted to align with a floor of said enclosure when said door is in the closed position.

3. The animal trap of claim 1 wherein said apertures comprise a plurality of substantially round apertures collectively having a surface area equal to at least one third a surface area of said upper section of the door.

4. The animal trap of claim 1 wherein said apertures comprise a plurality of thin vertical slots having an open surface area equal to at least one third a surface area of said upper portion of the door.

5. The animal trap of claim 1 wherein said apertures comprise a plurality of thin horizontal slots having an open surface area equal to at least one third a surface area of said upper portion of the door.

6. The animal trap of claim 1 wherein said weighted lower portion of said door has a cross-section comprising a cylindrical fraction.

7. The animal trap of claim 1 wherein said door is made of a material having a specific gravity exceeding 5.0.

8. The animal trap of claim 1 wherein said door is made of a polycarbonate polymer.

9. The animal trap of claim 8 wherein said polycarbonate polymer is a compound comprising fillers sufficient to raise its specific gravity to at least 5.0.

\* \* \* \* \*